UNITED STATES PATENT OFFICE.

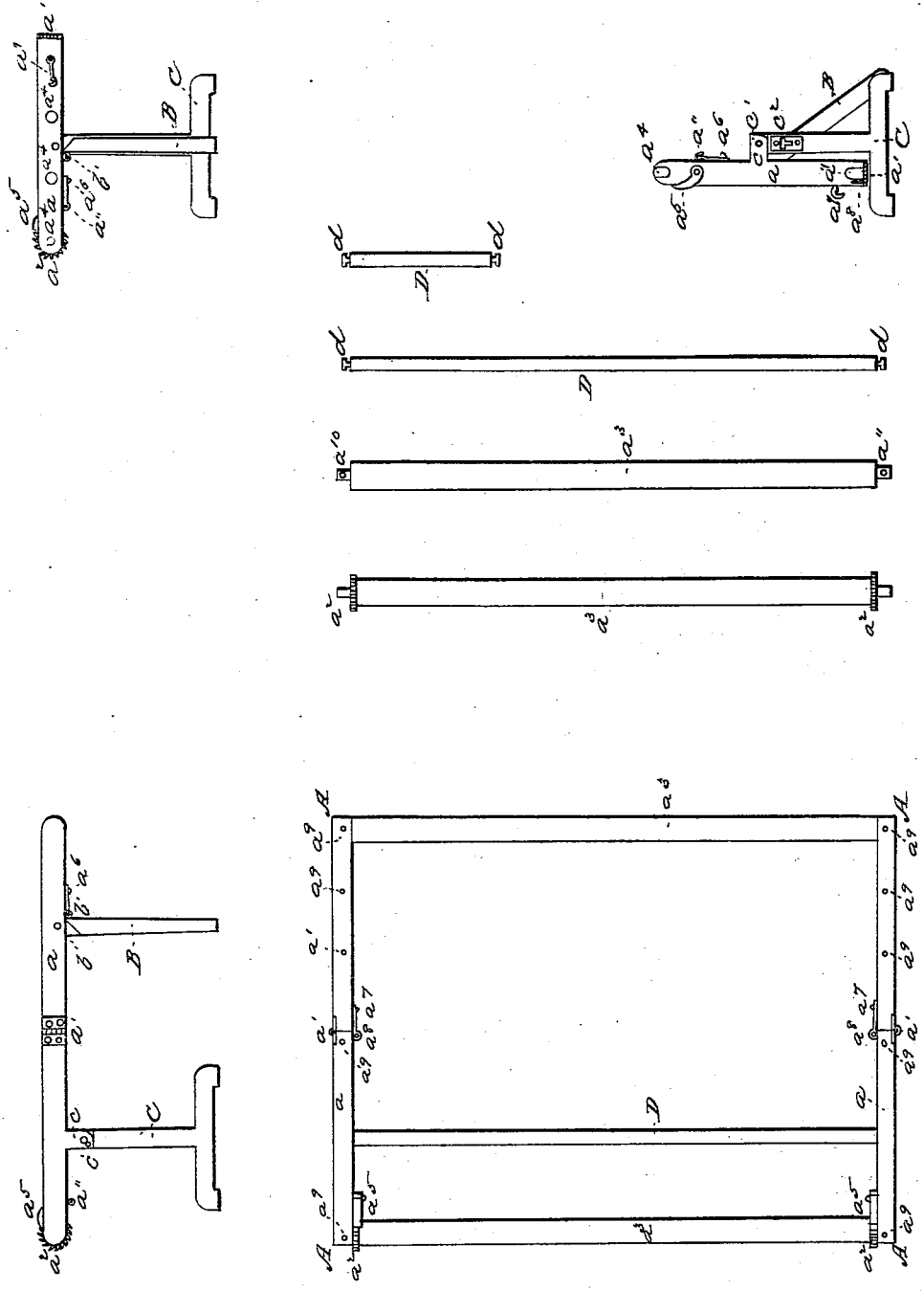

MAURICE SCHMIRK AND PETER McCOLLUM, OF FAYETTE, MISSOURI.

IMPROVED QUILTING-FRAME.

Specification forming part of Letters Patent No. 61,570, dated January 29, 1867.

To all whom it may concern:

Be it known that we, MAURICE SCHMIRK and PETER McCOLLUM, of Fayette, in the county of Howard and State of Missouri, have invented a new and useful Improvement on a Quilting-Frame; and we do hereby declare that the following is a clear, full, and exact description of the construction and operation of the same, reference being had to the annexed drawings, making a part of this specification, in which—

Figure I is a side view; Fig. II, a top view; Fig. III, a side view of the frame when shortened, and Fig. IV a side view of frame when folded up and laid aside.

The above-mentioned frame, known under the title of "the adjustable quilting-frame and clothes-drier," consists of a four-cornered frame, A, and the four legs B B C C, and the connecting-piece D. The four-cornered frame is composed of the side bars $a$, each of which can be turned and folded by means of hinges; also, the two rollers $a^3$, at the ends of one of which the ratchet-wheels $a^2$ are attached. In combination with said ratchet-wheels are the pawls $a^5$, fixed to the side bars $a$. On each of the side bars $a$ are two legs—one straight, B, the other, C, in the shape of an inverted T. Both of these are rendered adjustable by means of the hinges $b$ and $c$. The leg B can be fastened at right angles to the side bar $a$ by means of a hook, $a^6$, attached to said bar, and the eyelet $b^1$ fixed to the before-mentioned leg B. The leg C may be held at right angles to the bar $a$ by means of a pin, $c^1$, and its corresponding opening in said C. When the side bars $a\ a$ are unfolded they are held in position by a hook, $a^7$, attached to one side, and an eyelet, $a^8$, in the other. At the end of the connecting-piece D is fixed the hook $d$, fitting into the corresponding slit in the leg C. If a quilt is to be stretched upon the frame it is fastened to the rollers $a^3$, one of which is wound up and prevented from rolling back by the pawl and ratchet before mentioned. The side pieces $a$ are divided in the middle, and by means of hinges can be folded together, so as to admit of stretching smaller fabrics. The frame can also be lessened in size crosswise by having a smaller connecting-piece, D. Besides quilting, the frame can also be used as a clothes-drier, and when not in use it can be folded together so as to occupy very little space.

What we claim as our invention, and desire to secure by Letters Patent, is—

The combination of the frame A, the legs B and C, the connecting-piece D, in combination with the rollers $a^3$, the ratchet-wheels $a^2$, and their pawls $a^5$, the holes $a^4\ a^9\ a^{10}$, the hooks $a^6\ a^7$, the eyelets $a^8$ and $b^1$, the pin $c^1$ and its corresponding holes, the hook $d$, and the slit $c^2$, as and for the purpose specified.

MAURICE SCHMIRK.
PETER McCOLLUM.

Witnesses:
H. F. LAMMERS,
EDGAR SPANGENBERG.